United States Patent

[11] 3,594,527

| [72] | Inventors | Roy G. Brant<br>Huntington Beach;<br>Lloyd E. Hall, Fullerton, both of, Calif. |
|---|---|---|
| [21] | Appl. No. | 7,116 |
| [22] | Filed | Jan. 30, 1970 |
| [45] | Patented | July 20, 1971 |
| [73] | Assignee | Beckman Instruments, Inc. |

[54] ROTOR ASSEMBLY FOR ELECTRICAL SWITCH
13 Claims, 12 Drawing Figs.

[52] U.S. Cl. .................................................. 200/166 BH,
200/11 G, 200/168 C
[51] Int. Cl. .................................................. H01h 9/00
[50] Field of Search ............................................ 200/166
BH, 166 PC, 168 A, 168 C, 11 D, 11 E, 11 G

[56] References Cited
UNITED STATES PATENTS

| 3,298,641 | 1/1967 | Puerner | 200/168 C UX |
| 3,500,282 | 3/1970 | Slagg | 200/168 A X |
| 3,518,389 | 6/1970 | Doering, Jr. et al. | 200/166 BH |
| 3,525,825 | 8/1970 | Allison | 200/168 C X |

*Primary Examiner*—H. O. Jones
*Attorneys*—Ferd L. Mehlhoff and Robert J. Steinmeyer ABSTRACT: In a rotary switch having a plurality of switch contact pads disposed in an arcuate array around an aperture formed through a base member, a rotor and switch contact assembly mounted for rotation in the aperture. The assembly includes a nonconductive disc having a flat surface thereon and a hub section extending outwardly substantially normal to the surface of the disc. The hub is divided into at least two separate hub sections which extend through the aperture. The protruding ends of the hub sections are barb shaped thereby preventing withdrawal of the hub and rotor disc from the aperture of the base. A shaft is positioned within an opening in the disc and between the hub sections thereby locking the rotor within the aperture. A resilient contact member, supported on the surface of the disc, traverses an arcuate path on the surface of the base to sequentially contact the switch pads on rotation of the rotor assembly.

PATENTED JUL20 1971

INVENTORS
ROY G. BRANT
LLOYD E. HALL

BY *Gerd L Mekhoff*
ATTORNEY 3,594,527

ROTOR ASSEMBLY FOR ELECTRICAL SWITCH

SUMMARY OF THE INVENTION

The present invention relates to a simplified rotor and contact assembly for a switching device and is more particularly directed to an improved arrangement for rotatably attaching the rotor assembly within an aperture formed in a nonconductive base.

It is the object of the present invention to provide an improved rotor and contact assembly which may be easily assembled through an aperture formed in a base member, which rotor supports itself within the aperture and is locked into place on insertion.

Further objects and advantages of the invention will become apparent as the following description proceeds and the features of novelty which characterize the invention will be pointed out with particularity in the claims annexed to and forming a part of the specification.

DESCRIPTION OF THE PREFERRED EMBODIMENTS

Figure 1:
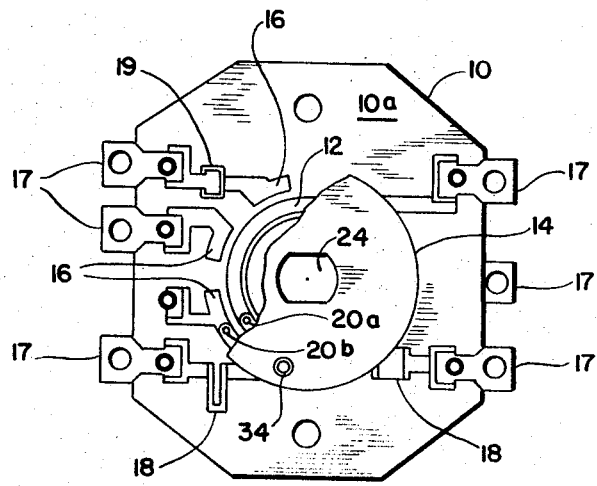
FIG. 1 is a plan view illustrating a base having deposited on the surface thereof an electrical switching network and employing the rotor and contact assembly of the present invention.
Figure 2:
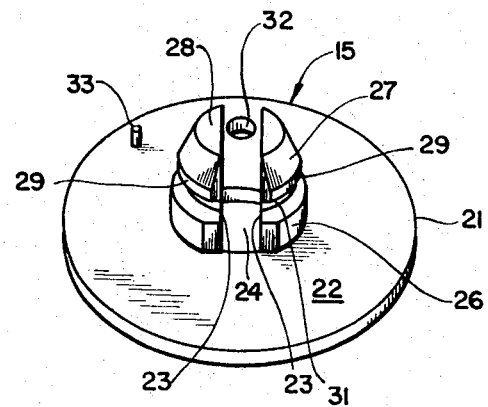
FIG. 2 is a greatly enlarged perspective view of the disc and hub sections comprising the rotor in this embodiment.
Figure 3:
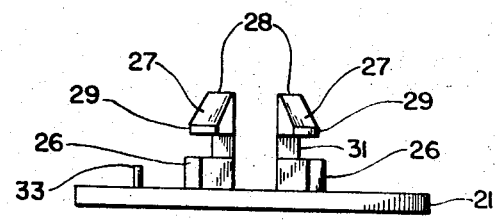
FIG. 3 is an enlarged plan view of the rotor.
Figure 4:
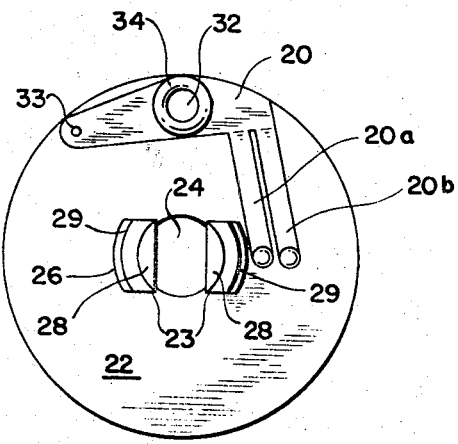
FIG. 4 is a plan view of the rotor and contact assembly.

Referring now to FIG. 1, there is shown a somewhat schematic embodiment of the invention in which the switch device includes a base member or wafer 10 substantially in the form of an octagon. The thin wafer or base member 10 may be formed of a nonconductive material, such as filled nylon or other plastic, or may be formed of a nonconductive high-temperature-resistant material, such as a ceramic material of alumina, steatite, or the like. At least one surface 10a of the base member or wafer is flat and supports an electrically conductive circuit network and its associated switching components which may be bonded to the base member or otherwise applied in any manner well known in the art, such as by vaporization or thick film deposition techniques. In the illustrated embodiment of FIG. 1, there is deposited on the surface 10a of the base member 10 an electrically conductive slip ring 12, formed in an arcuate path around an aperture 13 (see FIG. 5) formed through the base member 10. Within the aperture 13 there is positioned a rotor, generally designated by the reference numeral 14, which is mounted through the aperture for rotational movement therein.

Radially outward from the aperture and outwardly of the slipring 12, in the disclosed embodiment of the invention, there are provided a plurality of contact switch pads 16. Pads 16 may connect with terminals, such as terminal members 17 supported along the edges of the base member, or may be electrically connected with various points on an electrical circuit network also deposited on the surface of the base member. As will be seen in FIG. 1, portions of the electrical circuit network also are connected to terminals 17, which may be employed to electrically connect with other electrical components associated with the device to which the switch is attached.

In the illustrated embodiment, the electrical network includes resistors 18, a capacitor 19 and may include other electrical components, which may be either deposited on the surface of the base member 10 or otherwise mechanically attached thereto. One particular type of resistance material and conductive material for the conductive connectors and pads 16, which readily lends itself to adaptation to a ceramic substrate for a switch device, is a cermet material of the type described in U.S. Pat. No. 2,950,995 to Place et al. entitled "Electrical Resistance Element" and U.S. Pat. No. 2,950,996 to Place et al. entitled "Electrical Resistance Material and Method of Making Same," which patents are assigned to Beckman Instruments, Inc., the assignee of the present application. After cermet resistance materials are deposited on the base member, they may be tailored in order to alter or achieve the desired resistance value or capacitance values required for the electrical circuit network.

Directly attached to the rotor assembly 14 for rotation therewith is an electrically conductive contact member 20 including at least one conductive contact or wiper arm adapted to traverse an arcuate path along the surface of the base member 10. In the embodiment shown, the contact member 20 is provided with a pair of wiper arms 20a and 20b, one of which traverses the deposited collector ring 12 and the other of which engages in sequence the switching pads 16 during rotation of the rotor assembly.

As will now be explained, the present invention deals with the structure of the rotor member and its associated conductive contact or wiper 20 and the arrangement for supporting the rotor assembly on the base member. As will be seen in FIGS. 2—6, the rotor 14 comprises, in one preferred form, a flat disc 21 having a relatively flat surface 22 and a hub section protruding substantially normal to the surface of the disc. The hub is divided into two separate hub sections each designated by the reference numeral 23. The disc and hub sections may be molded or otherwise fabricated of a suitably resilient, nonconductive material such as polycarbonate or a filled nylon plastic or the like. A shaft opening 24 is formed through the center of the disc 21 and divides the hub into the two oppositely disposed hub sections 23.

In this embodiment of the invention, the hub sections are formed with a first shoulder 26 at the base of the hub adjacent the surface 22 of the disc. The end portions of the hub sections are in the shape of barbs 27. That is, they are narrow at the very end 28 of the hub and gradually taper outwardly in the direction of the disc. The combined or composite diameter and circumference at the end 28 of the hub, comprising the two sections 23 and the space or shaft opening therebetween, is less than the diameter and circumference of the opening 13 formed in the base member 10. The composite circumference of the hub sections around the obliquely extending shoulder 29 on the end portions or barbs 27 is greater than the circumference of the aperture in the base member. Between the first shoulder 26 and the protruding or oblique shoulder of the barb 29 there is provided an open space or groove 31. In this embodiment, the groove 31 on the two hub sections along with the space therebetween is of a dimension or circumference slightly less than that of the aperture 13 and the width of the groove 31 is slightly greater than the thickness of the base member or wafer 10.

The disc 21 may be provided with an opening 32 and a pin 33 for attaching the conductive contact 20. As may be seen in FIG. 4, the contact 20 is attached to the disc 21 by inserting the pin 33 through a hole formed in the contact and securing a rivet 34 through the contact and the opening or hole 32. This is merely one way of attaching the contact 20. There are, of course, many ways to attach the contact member. For example, it could be attached by suitable projections formed on the contact which may be molded into the disc when the rotor is formed. The wiper contact 20 is best formed of conductive material which has appropriate spring characteristics. A thin strip material commonly employed for use as a conductive spring contact member is beryllium-copper.

Figures 5, 6:
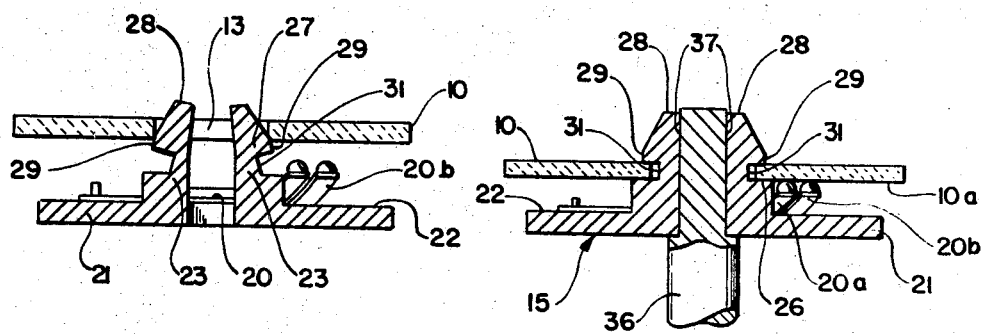
FIG. 5 is a cross-sectional view illustrating the insertion of the hub sections of the rotor into the aperture of a base member.
FIG. 6 is a cross-sectional view of the switch device showing the rotor and contact assembly locked into position on the base member.

As may be seen in FIGS. 5 and 6, the hub sections, or at least the outer extremities thereof, must be sufficiently resilient so that the barb-shaped ends flex or squeeze together as the hub sections are inserted through the aperture 13. Since the composite outer circumference at the end 28 of the hub fits within the circumference of the opening 13, a pressure exerted on the rotor assembly in a direction through the aperture 13 forces the barb-shaped end portions or barbs 27 through the aperture. The barbs flex or squeeze together until they clear the rear surface of the base 10. The barbs then return to their normal position and the base 10 fits within the groove 31 formed in the hub sections. As will be seen in FIG. 6, the shoulder 15 formed on the lower portion of the hub supports the rotor and disc so that the surface 22 is spaced from the surface 10a of the base member on which the electrical network and switch pads are deposited. Contact arms 20a and 20b are slightly depressed within the space between the disc and the surface 10a of the base 10 causing the contact arms to exert a slight pressure on the surface 10a of the base.

The rotor assembly, when positioned on the base member 10, is free to rotate in this position within the aperture 13. In order to securely retain the rotor in position within the aperture, a drive shaft 36 (seen only in FIG. 6) is inserted through the shaft opening 24 in the disc and hub section. The sides of the shaft, in the preferred embodiment of the invention, are provided with flat sections 37 which abut against the inner surface of the hub sections. The sides of the shaft prevent the barbs 27 from being forced inwardly, or compressed together. Thus, on insertion of the shaft 36 into the shaft opening, the rotor assembly is securely locked in place. There is no way to release the barbs 27 from the base member without first removing the drive shaft.

Figure 7:
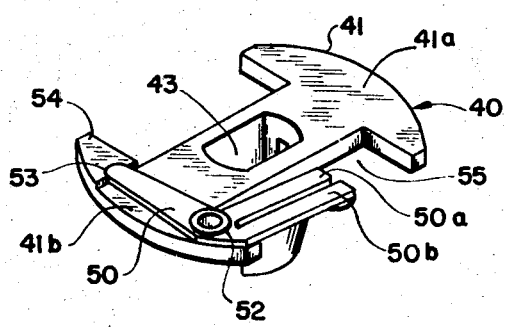
FIG. 7 is a perspective view of another embodiment of the invention.
Figures 8, 9:
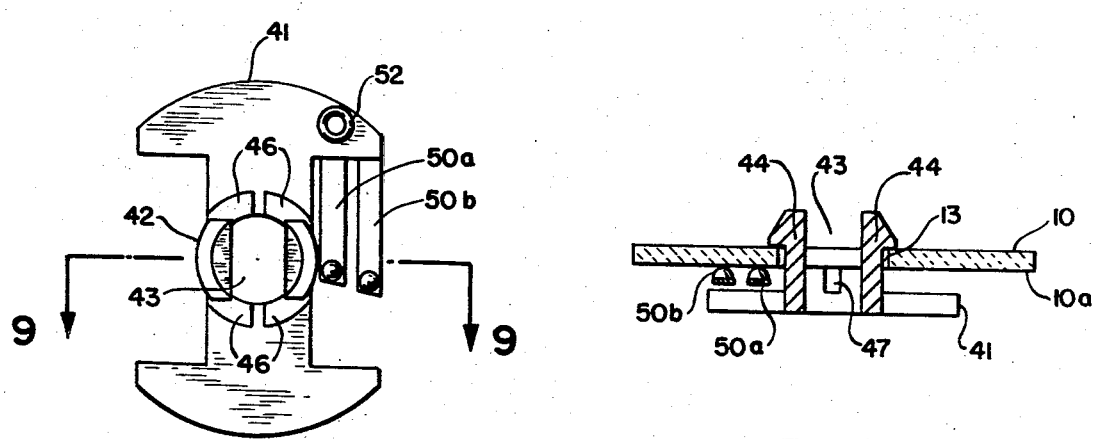
FIG. 8 is a plan view of the embodiment of FIG. 7 taken directly above the hub sections.
FIG. 9 is a cross-sectional view taken along the line 9-9 of FIG. 8 showing the rotor and contact assembly of this embodiment positioned within the aperture of a base member.

In FIGS. 7, 8 and 9, there is provided another embodiment of the invention. In this embodiment, the rotor assembly, which is generally designated by the reference numeral 40, comprises a disc 41 having the general shape of an I. In this embodiment of the invention, the contact member 50 is supported on the disc 41 by means of a rivet 52 with one end of the contact restrained from movement by insertion into an indentation 53 formed in an upraised abutment 54 formed on the disc. The contact arms 50a and 50b project into the space 55 between the ends 41a and 41b of the disc 41.

In this embodiment of the invention, the upwardly extending hub is again divided into two separate hub sections 42 which are separated by a shaft opening 43. The hub sections are provided, as may best be seen in FIG. 9, with barb-shaped ends 44. As in the previous embodiment, the ends of the hub sections have a composite diameter less than that of the aperture 13 formed in the base 10 and gradually increase or taper, in the direction toward the disc, to an outer composite circumference which is greater than that of the opening 13 in the base.

In this embodiment of the invention, the means for spacing the disc 41 from the surface 10a of the base comprises a pair of shoulders 46 formed on opposite sides of the opening 43 adjacent the upstanding edges of the hub sections 42. By positioning the shoulders 46 adjacent the edges of the hub sections rather than directly in line with the hub sections, it is possible to space the contact arms 50a and 50b closer to the hub section, as illustrated in FIGS. 8 and 9. In order to assure greater flexibility of the outwardly extending hub sections 44 during insertion through the opening 13, the shoulders 46, which are attached directly to the edges of the hub sections, are bifurcated, or separated by a space 47, which facilitates the flexing together of the hub sections 42 as they are snapped into opening 13 in the base member 10.

As in the previous embodiment, a shaft will be provided with flatted sections abutting against the inner surfaces of the hub sections 42 thereby holding the hub sections in place and locking the rotor assembly into place onto the base member 10.

Figure 11:
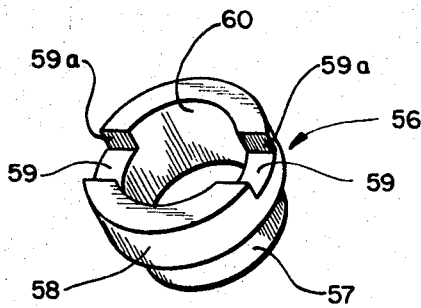
FIG. 11 is a perspective view of the sleeve member used in the embodiment shown in FIG. 10.
Figure 10:
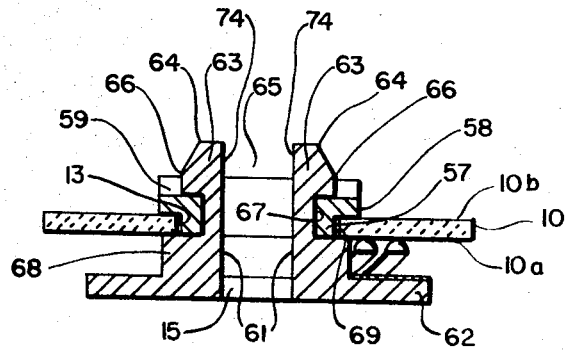
FIG. 10 is a cross-sectional view of still another embodiment of the invention.

Referring now to FIGS. 10 and 11, there is shown another embodiment of the invention. In this embodiment the hub sections do not form the bearing surface for rotation within the aperture 13. Instead, a cylindrical sleeve member 56 is provided which has a bearing section 57 positioned within the aperture 13 of the base 10. The sleeve 56 includes an axial bore 60 and a flanged section or shoulder 58 which abuts against the surface 10b of the base 10.

In this embodiment, the disc and hub assembly is similar to that shown in FIGS. 2—6, except that the hub sections 61 are somewhat longer. As may be seen in FIG. 10, the hub sections 61 extend outwardly from the contact carrying disc 62. The barb-shaped ends 63 are formed so that the composite diameter and circumference around the hub end 64 is less than the inner diameter and circumference of the bore 60 through the sleeve 56. The barbs taper outwardly in the direction of the disc to a diameter and composite circumference greater than the inner diameter and circumference of the bore in the sleeve 56.

The sleeve is provided with notched openings 59 formed in the shoulder or flanged section 58 which communicate with the bore 60 into which the barbs 63 fit on insertion of the hub assembly into the sleeve. As in the previous embodiments, the hub sections or barbs 63 flex inwardly on insertion of the hub through the sleeve. When the barbs 63 engage the notched openings 59, they resume their normal position and prevent withdrawal of the hub and disc as well as the sleeve 56 from the aperture 13 without depressing or squeezing the barbs toward each other. The opening 67 between the barbs 63 and the shoulder 68 formed on the hub sections is of a depth and width adapted to receive the sleeve 56. The bearing section 57 of the sleeve 56 should preferably be of a length approximately equal to the thickness of the base 10 so that shoulders 58 and 68 on the sleeve 56 and hub sections 61, respectively, form a groove 69 adapted to receive the base 10 without binding.

Figure 12:
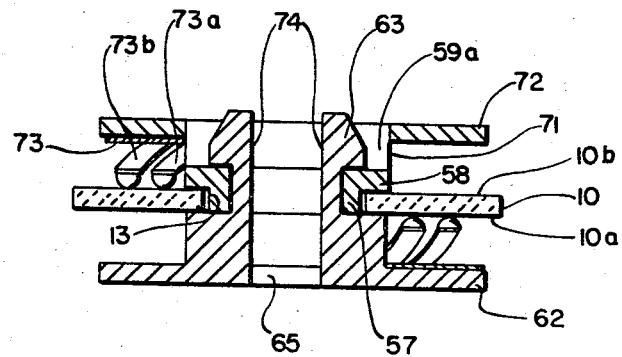
FIG. 12 is a cross-sectional view of a slightly modified version of the rotor of FIG. 10 in which the sleeve is provided with a contact-carrying disc.

A somewhat modified version of this last embodiment is shown in FIG. 12. In this arrangement, the flange section 71 of the sleeve is extended axially a short distance and is provided with a disc 72 similar to the disc 62. The disc 72 carries a contact member 73 including at least one resilient contact arm, such as arms 73a and 73b, biased into contact with the surface 10b of the base. In this arrangement surface 10b may also be provided with switch contact pads and a slipring similar to those shown on the plan view of FIG. 1.

A shaft having flatted sides, such as shaft 36 shown in FIG. 6, is inserted into the opening 65 (shown in FIGS. 10 and 12). The flatted sides of the shaft abut against the inner surfaces 74 of the hub sections and prevent disengagement of the barbs 63 from the notches. On rotation of the shaft, the entire rotor including the disc and hub assembly and the sleeve 56 (or sleeve and disc 72) rotate within the aperture. The sleeve provides a bearing surface. The sleeve 56 is caused to rotate because of the engagement of the barbs 63 with the notched openings 59 or, better, because of the engagement of the sidewalls 59a of the notches with the edge surfaces of the barbs 63.

While in accordance with the patent statutes, there has been described what are considered to be the preferred embodiments of the invention, it will be obvious to those skilled in the art that various changes and modifications may be made therein without departing from the invention and it is, therefore, the aim of the appended claims to cover all such changes and modifications as fall within the true spirit and scope of the invention.

What I claim is:

1. A rotor and contact assembly for a switch device formed of a nonconductive base having a circular aperture therethrough, the base also having switch contact pads disposed in an annular array on the surface thereof around the aperture, said rotor and contact assembly comprising:

a disc section formed of a nonconductive material and having at least one substantially flat surface thereon;

a hub extending outwardly substantially normal to said flat surface of said disc, said hub divided into at least two hub sections spaced apart from each other, each of said hub sections having the end portion thereof remote from said disc formed into the shape of a barb, the outer composite circumference around the end of said hub sections being less than the circumference of said aperture in said base and the composite circumference of said barb-shaped end portions gradually increasing to a circumference greater than that of the aperture in said base, the portion of said hub sections next adjacent said barb-shaped end portions being of a circumference less than that of said aperture in said base, said hub positioned through said aperture of said base for rotation therein with said barb-shaped end portions preventing withdrawal of said hub therefrom;

means spacing said flat surface of said disc from said base;

at least one electrically conductive contact member supported on said flat surface of said disc and including at least one resilient contact arm biased in a direction toward the flat surface of the base, said contact arm engaging the flat surface of said base and adapted to traverse an arcuate path into electrical contact with the switch contact pads during rotation of said disc;

a shaft opening through said disc and said hub, said shaft opening separating said hub sections from each other;

a rotatable shaft inserted into said shaft opening; and means preventing rotation of said shaft with respect to said disc and hub whereby rotation of said shaft causes said disc and hub to rotate within said aperture of said base.

2. The rotor and contact assembly for a switch device defined in claim 1 in which said shaft opening through said disc and said hub sections include flatted sides therein and said shaft is formed with flatted sides conforming to the shape of said shaft opening.

3. The rotor and contact assembly defined in claim 1 in which said spacing means comprises outwardly extending shoulders formed on said hub sections adjacent said flat surface of said disc and having an outer composite circumference greater than that of said aperture in said base.

4. The rotor and contact assembly defined in claim 1 in which said disc and hub is an integral piece formed of a plastic material and the barb-shaped end portions of said hub sections have sufficient resiliency to permit them to flex inwardly on inserting of the barb-shaped end portions through said aperture in said base.

5. The rotor and contact assembly defined in claim 4 in which said shaft on insertion into said shaft opening abuts against the inner surface of said barb-shaped end portions of said hub sections to prevent said barb-shaped end portions from flexing inwardly thereby locking said hub into place within the aperture of said base.

6. An electrical switch comprising:

a high-temperature-resistant, nonconductive base in the form of a thin wafer having an aperture therethrough;

a plurality of switch contact pads disposed on said base in an arcuate array around said aperture;

an electrical circuit network on said base including terminal means adapted to connect said electrical circuit network into an external electrical circuit and conductive connectors extending from said switch pads to respective points in said electrical circuit network;

a rotor disposed in said aperture through said base, said rotor comprising:

a disc section formed of a nonconductive material and having at least one substantially flat surface thereon facing said electrical circuit network on said base;

a hub extending outwardly from said disc through said aperture in said base, said hub divided into a pair of spaced-apart hub sections, each of said hub sections having the end portion thereof remote from said disc formed into the shape of a barb, the outer composite circumference around the end of said hub sections being less than the circumference of said aperture in said base and said barb-shaped end portions gradually tapering so that the composite circumference thereof is greater than that of said aperture through said base;

grooves formed on said hub sections adjacent said tapered barb-shaped end portions thereof, said groove adapted to receive said base therein and support said hub sections and said disc for rotation on said base with said barb-shaped end portions preventing withdrawal of said hub therefrom;

at least one electrically conductive contact member supported on said surface of said disc, said contact member including a resilient switch contact arm biased against the surface of said base and adapted to engage said switch contact pads during rotation of said rotor;

a shaft opening through said disc and between said hub sections; and a shaft inserted into said shaft opening for rotating said rotor and its contact with respect to said base, said shaft bearing on the inner surface of said barb-shaped end portions of said hub sections thereby locking said rotor into position within said aperture of said base.

7. The switch device defined in claim 6, in which said rotor in which said disc and hub is an integral piece of plastic material and the barb-shaped end portions of said hub sections are sufficiently resilient to permit them to flex inwardly on insertion through said aperture of said base.

8. A rotor and contact assembly for a switch device formed of a nonconductive base having a circular aperture therethrough, the base also having switch contact pads disposed in an annular array on the surface thereof around the aperture, said rotor and contact assembly comprising:

a cylindrical sleeve having a bearing section disposed within said aperture of the base and including a flanged portion of greater diameter than said aperture abutting against one surface of said base, said flanged portion having notched openings formed therein communicating with a bore in said sleeve;

a disc section formed of a nonconductive material and having at least one substantially flat surface thereon;

a hub extending outwardly substantially normal to said flat surface of said disc, said hub divided into at least two hub sections spaced apart from each other by a shaft opening formed through said disc and said hub, each of said hub sections having an end portion thereof remote from said disc formed into the shape of a barb, the outer composite circumference around the ends of said hub sections being less than the circumference of said bore through said sleeve and the composite circumference of said barb-shaped end portions gradually increasing to a circumference greater than that of the bore through said sleeve, the portion of said hub sections next adjacent said barb-shaped end portions being of a circumference less than that of said bore of said sleeve, said hub positioned through said bore of said sleeve with said barb-shaped end portions on said hub sections extending into said notched openings in said sleeve thereby preventing withdrawal of said hub from said sleeve;

means spacing said flat surfaces of said disc from said base;

at least one electrically conductive contact member supported on said flat surface of said disc and including at least one resilient contact arm biased in a direction toward the surface of the said base, said contact arm engaging the surface of said base and adapted to traverse an arcuate path into electrical contact with the switch contact pads during rotation of said rotor;

a rotatable shaft inserted into said shaft opening; and means preventing rotation of said shaft with respect to said disc and hub whereby rotation of said shaft causes said rotor and contact assembly to rotate within said aperture of said base.

9. The rotor and contact assembly defined in claim 8 in which said shaft opening through said disc and said hub sections includes flatted sides therein and said shaft is formed with flatted sides conforming to the shape of said shaft opening.

10. The rotor and contact assembly defined in claim 8 in which said rotor and said sleeve are formed of a plastic material and the barb-shaped end portions of said hub sections of said rotor have sufficient resiliency to flex inwardly on insertion of said barb-shaped end portions through said sleeve.

11. The rotor and contact assembly defined in claim 8 in which the notched openings in said flange of said sleeve are of a width adapted to provide a close fit with said barb-shaped end portions on said hub sections thereby eliminating rotational movement of said barb-shaped end portions with respect to said sleeve.

12. The rotor and contact assembly defined in claim 8 in which said sleeve is provided with a disc attached thereto and spaced from the surface of said base opposite from that surface of said base faced by said disc attached to said hub, and said disc on said sleeve includes a second electrically conductive contact member having at least one resilient contact arm biased against the surface of said base and adapted to traverse an arcuate path into electrical contact with switch contact pads formed on the surface of said base.

13. A rotor and contact assembly for a switch device formed of a nonconductive base having a circular aperture therethrough, the base also having switch contact pads disposed in an annular array on opposite surfaces thereof around the aperture, said rotor and contact assembly comprising:

a cylindrical sleeve having a circular bore therethrough and including a bearing section disposed within said aperture of said base, said sleeve including an annular flanged section abutting against a surface of said base, said sleeve including notched openings spaced from the bearing section and communicating with said bore through said sleeve, said sleeve also including an outwardly extending disc integral with said sleeve and spaced from the surface of said base;

a hub member positioned within said bore of said sleeve and including a disc attached thereto and spaced from the surface of said base opposite from said surface faced by said disc on said sleeve, said hub divided into two hub sections spaced apart from each other by a shaft opening formed through said disc and said hub, each of said hub sections having the end portions thereof remote from said disc formed into the shape of a barb, the outer composite diameter around the ends of said hub sections being less than the bore of said sleeve and the composite diameter of said barb-shaped end portions gradually increasing to a diameter greater than the bore diameter of said sleeve, the portions of said hub sections next adjacent said barb-shaped end portions being of a diameter substantially the same as the bore through said sleeve, said hub positioned within said bore with said barb-shaped end portions extending into said notches formed in said sleeve so that said barb-shaped end portions prevent withdrawal of said hub therefrom;

a pair of electrically conductive contact members, each of said contact members supported on the inner surfaces of said respective discs and including contact arms biased against the opposite surfaces of said base, said contact arms each adapted to traverse an arcuate path into electrical contact with the switch contact pads on opposite sides of said base during rotation of said rotor;

and a rotatable shaft positioned through said shaft opening in said hub and said disc, said rotatable shaft having flatted sides abutting the inner surfaces of said hub sections thereby preventing said barb-shaped end portions of said hub sections from flexing inwardly and thereby locking said barb-shaped end portions into place within said sleeve to cause said hub and sleeve to rotate during rotation of said rotatable shaft.